United States Patent [19]
Bauer

[11] Patent Number: 5,850,975
[45] Date of Patent: Dec. 22, 1998

[54] MATERIAL SPREADER

[76] Inventor: Lloyd Bauer, N 5610 Rich Lake Rd., Ogdensburg, Wis. 54962

[21] Appl. No.: 625,124

[22] Filed: Apr. 1, 1996

[51] Int. Cl.$^6$ ...................................................... A01C 3/06
[52] U.S. Cl. .......................... 239/657; 239/670; 239/680; 239/684; 239/689
[58] Field of Search .................................... 239/650, 657, 239/668, 670, 680, 681, 682, 684, 689; 222/626

[56] References Cited

U.S. PATENT DOCUMENTS

| | | | |
|---|---|---|---|
| 790,999 | 5/1905 | Barrows | 23/681 |
| 2,359,412 | 10/1944 | Flink | 239/657 |
| 2,416,224 | 2/1947 | Schmied | 239/657 |
| 2,702,711 | 2/1955 | Purcell | 239/680 |
| 2,769,641 | 11/1956 | Brown | 239/680 |
| 2,885,209 | 5/1959 | Bruecker | 275/6 |
| 2,947,543 | 8/1960 | Raybould | 239/657 |
| 3,010,726 | 11/1961 | Smoker et al. | 275/4 |
| 3,185,326 | 5/1965 | Vanderloop | 214/83.36 |
| 3,572,592 | 3/1971 | Jankowski | 239/680 |
| 3,602,404 | 8/1971 | Frank | 222/252 |
| 3,627,210 | 12/1971 | Van der Lely | 239/657 |
| 4,026,476 | 5/1977 | Ipnar et al. | 239/680 |
| 4,498,630 | 2/1985 | Sadler | 239/684 |
| 4,568,028 | 2/1986 | Verseef et al. | 239/657 |
| 4,732,330 | 3/1988 | Groeneveld et al. | 239/670 |

*Primary Examiner*—Andres Kashnikow
*Assistant Examiner*—Lisa Ann Douglas
*Attorney, Agent, or Firm*—Ryan, Maki, Mann & Hohenfeldt

[57] ABSTRACT

A material spreader which is adapted to be towed behind a tractor includes a chassis mounted on at least one pair of wheels positioned toward its rear. A box for transporting and dispensing materials is pivotable from a horizontal position to a substantially vertical position and is provided with a rotatably driven beater mounted to its rear. The interior of the box is devoid of any material moving mechanism except for the beater. A vertical support member extends upwardly from each side of the chassis adjacent to the pair of wheels. Each vertical support member is provided with a pivot point adjacent to its upper end for pivotally supporting the box at an elevated location above the rear axle. The box is pivotally supported at a location spaced forwardly from its rear a distance at least equal to the height of the box. The beater and a hydraulic cylinder for raising the box is adapted to be coupled to the hydraulic system of a towing tractor.

7 Claims, 3 Drawing Sheets

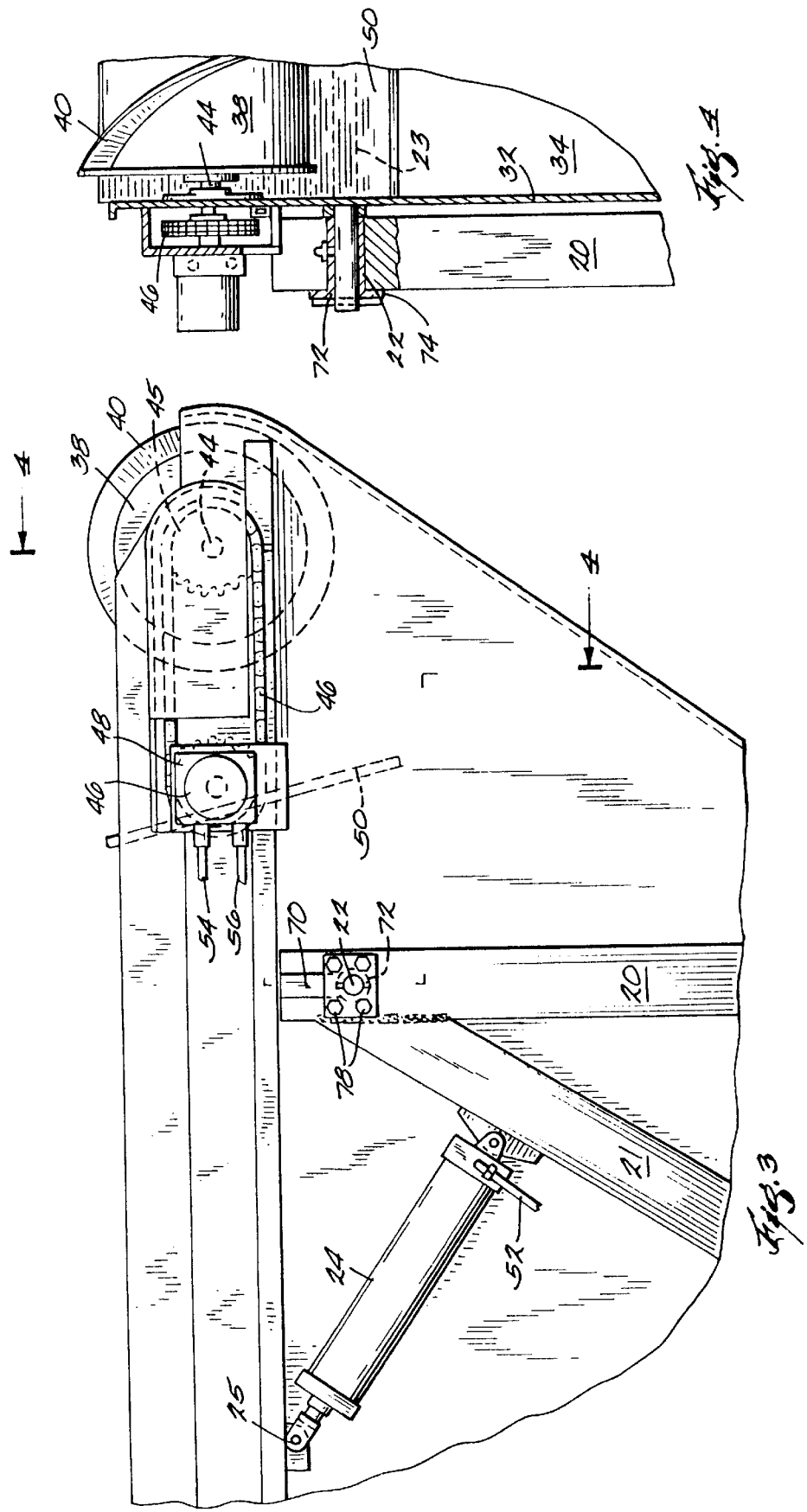

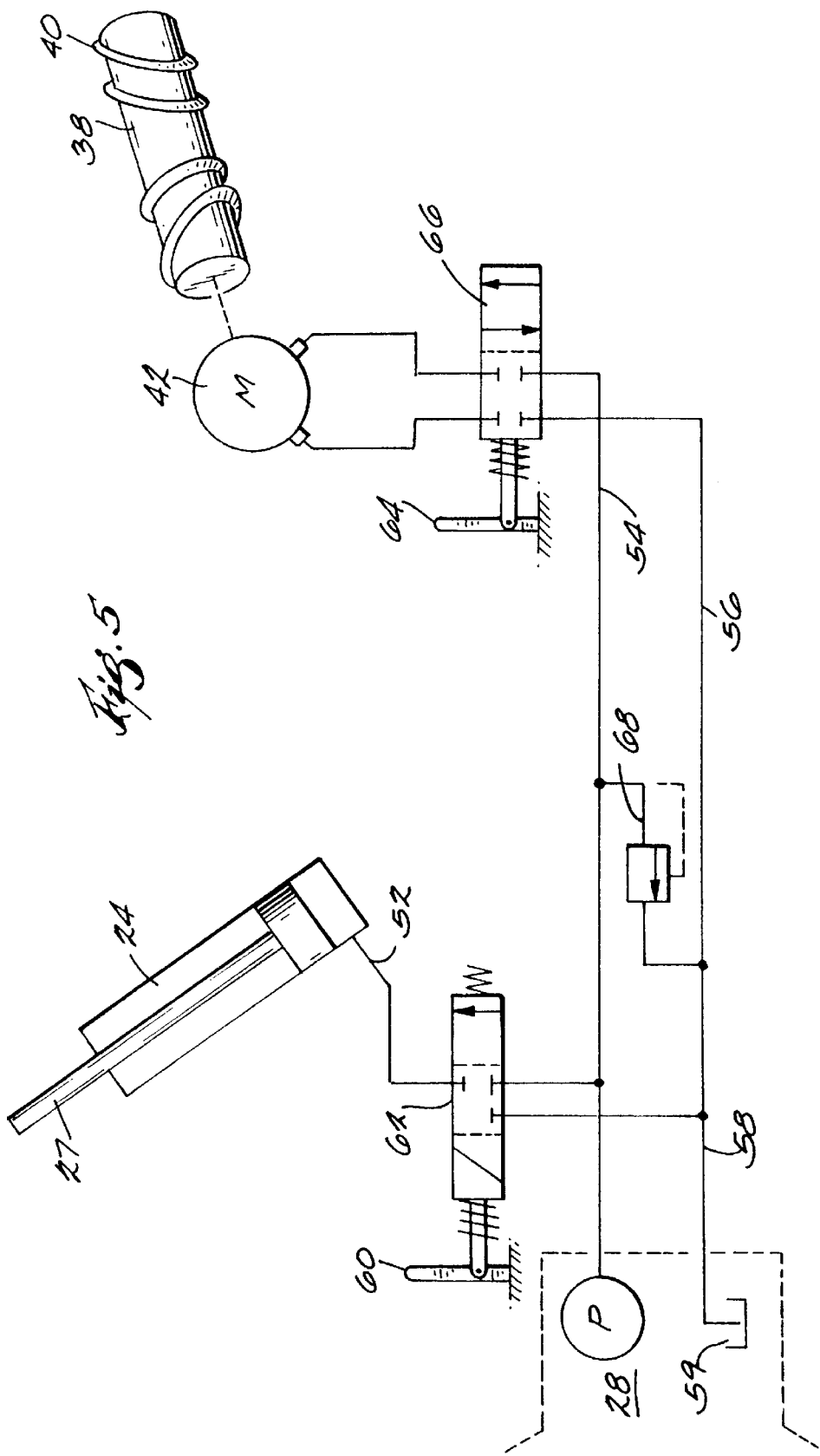

5,850,975

MATERIAL SPREADER

FIELD OF THE INVENTION

The invention relates to material spreaders. More specifically the invention relates to a machine such as a manure spreader which utilizes the force of gravity to discharge the manure from the rear of the spreader.

BACKGROUND OF THE INVENTION

Conventional manure spreaders have generally included an unloading component which includes chains, sprockets, crossbars, and beaters to move the manure toward and out of the rear of the spreader. Due to the corrosive conditions encountered by the working parts of such spreaders caused be exposure to animal wastes over a great range of temperatures, these spreaders are expensive and time consuming to maintain. Various such spreaders have been devised which have a tiltable box so that the discharge of the manure or other materials being spread is assisted by the force of gravity. See for example U.S. Pat. Nos. 2,885,209, 3,010,726, 3,185,326, or 3,602,404. It has further been proposed to eliminate the use of unloading devices within the box of such spreaders. See U.S. Pat. No. 3,627,210. In the case of the latter patent, however, the entire box is tiltable about an axis located directly at the rear and bottom of the box. Due to the difficulty in raising such a box to a position approaching a vertical orientation, however, as a practical matter the box could only be tilted to a position substantially short of vertical.

A need has thus continued to exist for improved manure spreaders, or spreaders for other materials, which are simpler to use and economical due to the elimination of moving parts heretofore deemed necessary.

SUMMARY OF THE INVENTION

The present invention has as its principle object the provision of a gravity fed spreader of improved design. In accordance with an important aspect of the invention, such a spreader is provided in which the box is pivotable about an axis spaced above rear most wheel of the spreader. In accordance with a related aspect the box of the spreader of the present invention is connected to a pivot support at a location near the top of the box and can be raised to a substantially vertical position. In accordance with a still further related aspect of the invention the rear of the box can be lowered, in accordance with the preferred embodiment, to a position lower than the axle of a supporting wheel.

In accordance with still further aspects of the invention, a single beater element can be provided in the rear of the spreader which beater is provided with one or more spiral flanges to assist in the uniform discharge of material from the rear of the spreader. In accordance with a still further aspect of the invention the beater element can be driven by a hydraulic motor, utilizing pressurized hydraulic fluid, and thus power, provided by a towing tractor. In accordance with a still further aspect the tilting mechanism used to raise the forward end of the box of the spreader can be hydraulically raised utilizing this same source of hydraulic power.

In accordance with a yet further aspects of the invention at least one baffle is provided on the spreader to prevent forward splattering of manure or other materials being discharged. A still further related aspect of the invention involves the use of a box of a smooth contour which minimizes resistance to outward flow of the material being discharged. A still further related aspects of the invention relates to the use of a coating such as an epoxy resin which will protect the materials from which the spreader box is formed and also assist in minimizing resistance to flow of the material out of the rear of the spreader.

Briefly, a material spreader of this invention is adapted to be towed behind a tractor includes a chassis mounted on at least one pair of wheels positioned toward its rear. A box for transporting and dispensing materials is pivotable from a horizontal position to a substantially vertical position and is provided with a rotatably driven beater mounted to its rear. The interior of the box is devoid of any material moving mechanism except for the beater. A vertical support member extends upwardly from each side of the chassis adjacent to the pair of wheels. Each vertical support member is provided with a pivot point adjacent to its upper end for pivotally supporting the box at an elevated location above the rear axle. The box is pivotally supported at a location spaced forwardly from its rear a distance at least equal to the height of the box. The beater and a hydraulic cylinder for raising the box is adapted to be coupled to the hydraulic system of a towing tractor.

BRIEF DESCRIPTION OF THE DRAWINGS

FIG. 3 is a fragmentary side elevational view showing the upper rear quadrant of a spreader of the present invention;

FIG. 4 is a fragmentary sectional view taken along line 4—4 of FIG. 3; and

FIG. 5 is a diagrammatic view of a hydraulic power control assembly for use in connection with the invention.

DETAILED DESCRIPTION OF PREFERRED EMBODIMENT

Figure 1:
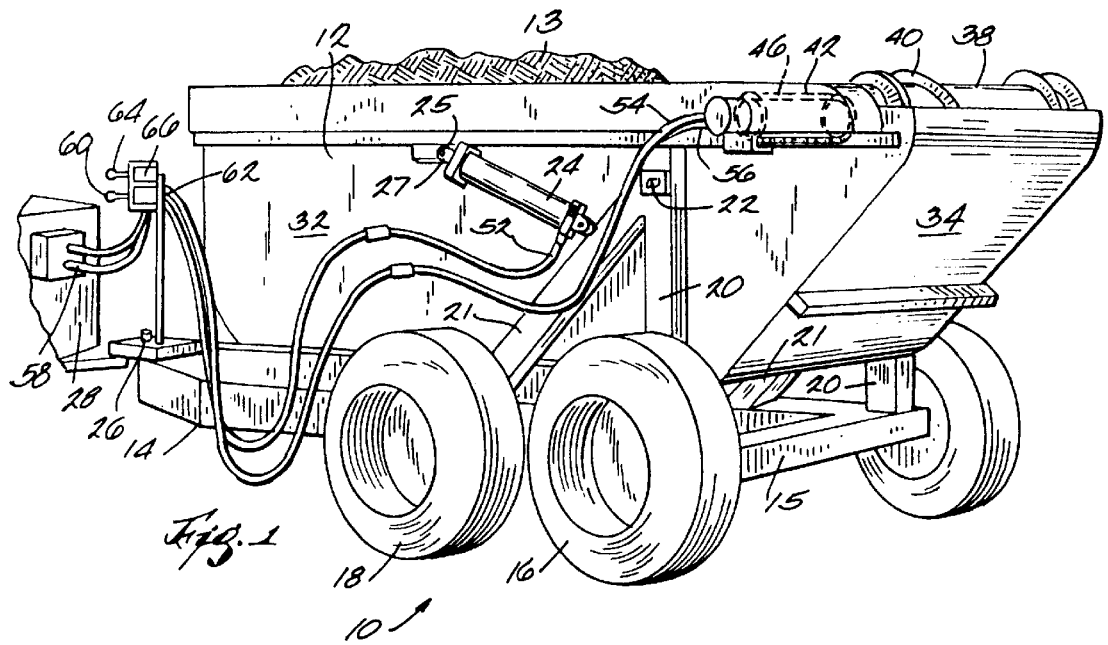
FIG. 1 is a perspective view with parts broken away of a spreader of the present invention.

Referring more specifically to the drawings, there is seen a spreader 10 of an embodiment of this invention. Spreader 10 includes a box structure or compartment 12 for carrying material such as manure 13. Box 12 is supported on a chassis 14 of generally conventional design which is provided with wheels on 16 and 18 on each side thereof in accordance with a preferred embodiment. If desired, single axle with a single pair of wheels 16 could be utilized instead of the preferred tandem wheels illustrated in the drawings.

Figure 2:
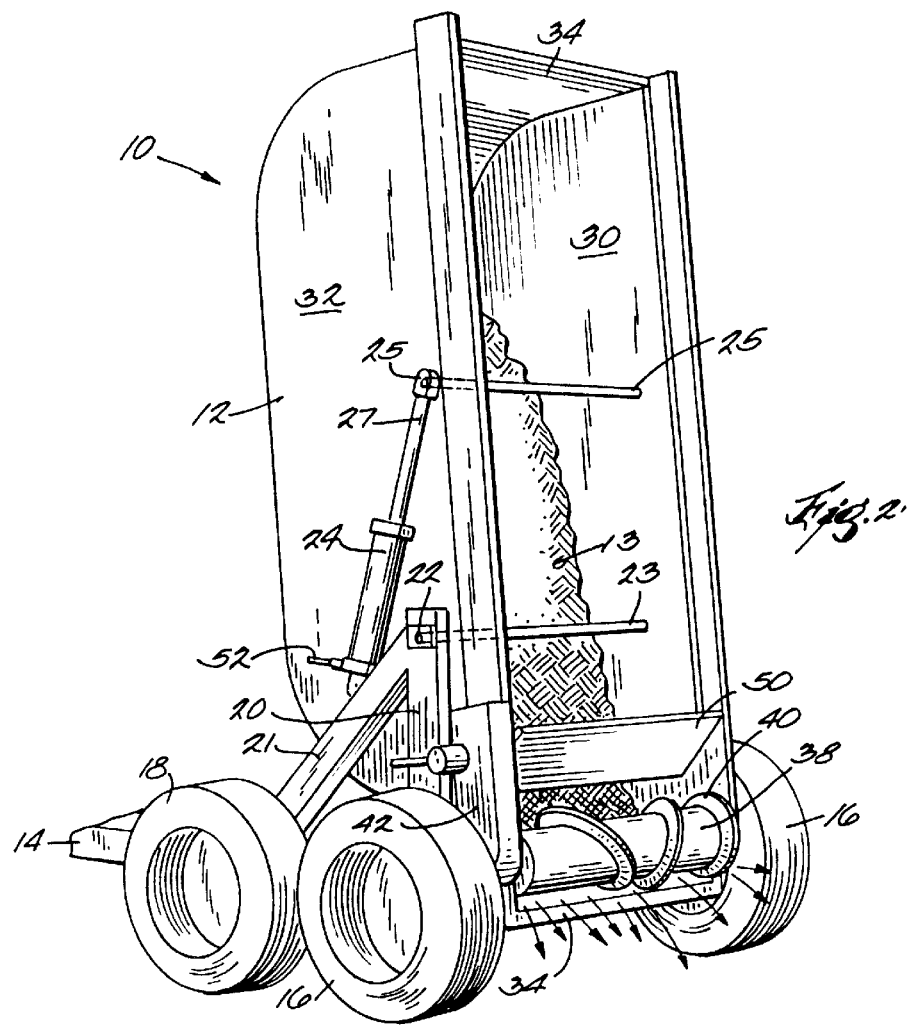
FIG. 2 is a perspective view of the spreader of FIG. 1 shown in an elevated position.

A vertical supporting frame member 20 extends upwardly on each side preferably in vertical alignment above rear axle 15. Chassis 14 is connected at its forward end to a conventional hitch structure 26 for attachment to a towing tractor drawbar 28 or the like. A bracing member 21 extending between vertical member 20 and chassis side frame 14, angularly arranged as shown, adds rigidity and strength to the structure. Near the top of vertical member 20 is an opening 22 which serves as a pivot point for pivoting elevation of box 12 from the horizontal orientation shown in FIG. 1 to the vertical orientation shown in FIG. 2. A bar 23 extends between openings 22 on the opposite sides 30 and 32 of box 12 as best seen in FIG. 2 and preferably serves as a pivoting shaft for box 12. A hydraulic cylinder 24 on each side of box 12 is attached at one end to brace number 21 and at its opposite end to a second crossbar 25 extending between panels 30 and 32. Box 12 is thus pivoted into an upright or dumping orientation seen in FIG. 2 by extension of rod 27 out of cylinder 24. Placement of the hinge point 22 in an elevated location above the rear axle 15 enables pivoting of box 12 to the location of FIG. 2 wherein the rear of the box is at a location behind and somewhat lower than axle 15 and the box is enable to travel to a substantially vertical position to effectively discharge the manure 13.

Also as best seen in FIG. 2 the bottom 34 of box 12 is a smoothly contoured single sheet of material forming the front bottom and rear of box 12 and is preferably formed of a metal having a corrosion resistant coating such as an epoxy resin which also smoothly coats the interior of the side panels 30 and 32.

A rotatable beater 38, preferably fitted with spiral outwardly extending flanges 40, extends between sides 30 and 32 at the rear of box 12. A hydraulically driven motor 42 on at least one side of box 12 is provided to drive the beater mechanism 38 for dispensing manure from the rear of the spreader. In the illustrated preferred embodiment, central shaft 44 of beater component 38 is provided with a sprocket 45 driven by a link chain 46 which is in turn driven by a sprocket 38 driven by motor 42 as best seen in FIG. 3.

In order to avoid the forward splatter of manure or other dispensed materials exiting the rear of box 12 or clinging to the beater mechanism 38, a baffle 50 is provided forwardly of beater mechanism 38. Baffle 50 thus effectively shields the operator of a towing tractor from being splattered by manure which may fly off of the surface of the beater mechanism 38.

Also it will be noted that cylinder 24 is attached to the hydraulic system of the towing tractor by means of hoses 52. Similarly motor 42 is provided with such connection by means of an inlet hose 54 and an outlet hose 56. The cylinders 24 and motor 42 can thus be controlled from the driver's seat of the towing tractor. Control levers of conventional design are thus provided for extension or retraction of cylinder 24. In operation the cylinders 24 will be extended gradually to tilt the box 12 gradually upwardly at a rate sufficient to insure a uniform distribution of manure 13 on the ground. As the box 12 empties it is ultimately raised to the vertical position shown in FIG. 2 to ensure emptying thereof through the rear discharge opening between box panel 34 and the beater 38. Complete emptying of box 12 is thus ensured by gravity flow, the action of beater 38, and the assistance of normal vibration encountered during towing of the spreader 10 through the rough terrain or irregular surface typical of a field. In the illustrated embodiment the force of gravity returns the box 12 to the horizontal position.

In FIG. 5 there is shown a typical hydraulic power supply and control assembly used in connection with the invention. A pressurized source of hydraulic fluid P is provided on the towing tractor 28. A control lever arm 60 located either on the rear portion of the tractor, or, more preferably, on the forward end of the spreader 10, operates a valve 62 which, as indicated, provides hydraulic fluid by means of connecting line 52 to cylinder 24. When hydraulic fluid is fed through line 52 by operation of valve 62, piston rod 27, of course, is extended. In the neutral position shown in FIG. 5, cylinder 24 and rod 27 remain stationary. When the control lever 60 is moved to the right (in the illustration) the fluid from cylinder 24 can drain through line 52 and through a return line 58 to a fluid reservoir 59 on the tractor 28. In this case the weight of box 12 will cause the hydraulic fluid to flow into the return line when the appropriate path is opened through valve 62.

Beater 38, as previously noted, is driven by hydraulic motor 42. A second control handle 64 is provided to operate a valve 66 which enables flow of hydraulic fluid from pump P through lines 54 and 56 to and from motor 42 to cause rotation of beater element 38. As noted, when lever 64 is pulled to the left rotation of motor 42 will be caused. A bypass line 68 can be provided to allow for continuous flow of the fluid when the lever 64 is in a neutral position to as illustrated in FIG. 5 to prevent flow of hydraulic fluid through motor 42.

Referring again to FIGS. 3 and 4, the preferred mode of securement of box 12 to frame support upright member 20 is illustrated. The upper end of each member 20 is provided with a longitudinal slot 70. Slot 70 is of a width sufficient to receive bar 23. Opening 22 at the lower end of slot 70 is of a somewhat greater diameter. A sleeve 72 is fitted over the end of shaft 23 and within opening 22, thus preventing the ends of shaft 23 from sliding upwardly in slot 70. Sleeve 72 has a plate 74 welded to one end, as shown. A pin through each end of shaft 23 serves to prevent endwise movement thereof. Bolts 78 secure plate 74 and hence sleeve 72 in place, thus securing box 12 to frame 14. It will thus be appreciated that, in the illustrated embodiment, box 12 can effectively be detached from frame 14 by removal of the eight bolts 78.

While preferred embodiments of the invention have been described herein in detail it will be apparent to those skilled in the art that various modifications may be made. The true scope of the invention is thus defined by the appended claims including equivalents thereof.

What is claimed is:

1. A material spreader adapted to be towed behind a tractor comprising a chassis mounted on wheels, at least one pair of wheels being positioned toward the rear of said chassis, a material-containing box with an open top and having front, rear and side walls each having a height and upper and lower edges, said box being provided for transporting and dispensing materials out of the rear of said box, said box being pivotable from a horizontal position to a substantially vertical position, at least one rotatably driven beater mounted to the rear of said box, said box being devoid of any material moving mechanism except for said beater, a vertical support member extending upwardly from each side of said chassis adjacent to said pair of wheels to an upper end adjacent to said upper edge, each said vertical support member being provided with a pivot point adjacent to said upper end for pivotally supporting said material containing box at an elevated location on said box spaced above said rear axle, said box being pivotally supported at a location elevated above said lower side edges and spaced forwardly from the rear of said box a distance at least equal to the height of said box, and controllable means for raising the forward end of said box about said pivot support.

2. A spreader according to claim 1 wherein said controllable means comprises a hydraulic cylinder on at least one side of said box, said hydraulic cylinder being adapted to be coupled to a hydraulic system of a towing tractor.

3. A spreader according to claim 2 wherein a shaft extends between opposed side walls of said box at the point of connection thereto of said hydraulic cylinder.

4. A spreader according to claim 1 including a hydraulic motor and wherein said beater is driven by said hydraulic motor.

5. A spreader according to claim 1 wherein the interior of said box is coated with an epoxy resin.

6. A spreader according to claim 1 wherein a shaft extends between opposed side walls of said box at said pivot point.

7. A spreader according to claim 1 wherein the pivot support is connected to said box at a location near the upper edge of the side walls of said box.

* * * * *